United States Patent
Ito et al.

(10) Patent No.: US 7,953,540 B2
(45) Date of Patent: May 31, 2011

(54) AIR INTAKE CONTROL DEVICE OF V-DIESEL ENGINE

(75) Inventors: Yoshiyasu Ito, Toyota (JP); Yuji Narita, Kariya (JP)

(73) Assignees: Toyota Jidosha Kabushiki Kaisha, Aichi-ken (JP); Kabushiki Kaisha Toyota Jidoshokki, Aichi-ken (JP)

( * ) Notice: Subject to any disclaimer, the term of this patent is extended or adjusted under 35 U.S.C. 154(b) by 151 days.

(21) Appl. No.: 12/096,841

(22) PCT Filed: Feb. 6, 2007

(86) PCT No.: PCT/JP2007/051986
§ 371 (c)(1),
(2), (4) Date: Jun. 10, 2008

(87) PCT Pub. No.: WO2007/091542
PCT Pub. Date: Aug. 16, 2007

(65) Prior Publication Data
US 2009/0223477 A1    Sep. 10, 2009

(30) Foreign Application Priority Data
Feb. 8, 2006  (JP) .................. 2006-031095

(51) Int. Cl.
*F02D 41/00* (2006.01)
*F02M 35/10* (2006.01)
(52) U.S. Cl. .................. 701/103; 123/184.53
(58) Field of Classification Search .................. 701/103; 123/184.53, 564, 568.11, 568.12, 598.19, 123/568.2, 568.21
See application file for complete search history.

(56) References Cited

U.S. PATENT DOCUMENTS

| | | | | |
|---|---|---|---|---|
| 4,922,864 A | * | 5/1990 | Maeda | 123/184.28 |
| 5,000,130 A | | 3/1991 | Yamada | |
| 5,152,270 A | * | 10/1992 | Miyamoto | 123/692 |
| 6,957,141 B1 | | 10/2005 | Wakairo | |
| 7,305,828 B2 | * | 12/2007 | Todoroki et al. | 123/568.11 |
| 7,665,297 B2 | * | 2/2010 | Suzuki et al. | 123/568.21 |

FOREIGN PATENT DOCUMENTS

| | | |
|---|---|---|
| CN | 1690396 A | 4/2011 |
| EP | 0393249 A1 | 10/1990 |
| JP | 2777817 B2 | 5/1998 |
| JP | 11-050851 A | 2/1999 |
| JP | 2004-124778 A | 4/2004 |
| JP | 2004-232602 A | 8/2004 |
| JP | 2005-061270 A | 3/2005 |
| JP | 2005-344707 A | 12/2005 |
| JP | 2005-351220 A | 12/2005 |
| WO | 2005/108756 A1 | 11/2005 |

OTHER PUBLICATIONS

Chinese Office Action dated Jan. 26, 2011.

* cited by examiner

*Primary Examiner* — Hieu T Vo
(74) *Attorney, Agent, or Firm* — Sughrue Mion, PLLC

(57) ABSTRACT

An intake passage of a V diesel engine 10 has a pair of distributing lines 19L, 19R connected to corresponding banks 11L, 11R, a converging line 16 that connects the distributing lines 19L, 19R to each other, and a pair of branch lines 15L, 15R branched from the converging line 16 and extending upstream. Boost pressure changing mechanisms 50L, 50R, air intake throttle valves 51L, 51R, and exhaust flow rate adjusting valves 52L, 52R are provided in correspondence with the branch lines 15L, 15R and inlet lines 13L, 13R. A control section 41 controls operation of each of these actuators in accordance with a common target control value.

9 Claims, 3 Drawing Sheets

AIR INTAKE CONTROL DEVICE OF V-DIESEL ENGINE

FIELD OF THE INVENTION

The present invention relates to an air intake control device of a V-diesel engine that controls the condition of intake air supplied to the V-diesel engine.

BACKGROUND OF THE INVENTION

Recently, the number of cylinders in diesel engines of vehicles has been increasing in accordance with demands for higher powers and larger displacement. For example, if a diesel engine has six or eight cylinders, the engine is arranged often as a V type in which the cylinders are arranged in a V shape in order to save space in the engine compartment. As shown in FIG. 4, an intake passage 2 of the V-engine includes a common upstream portion and branched downstream portions, which are connected to a pair of banks 1L, 1R. The intake air is thus distributed to the corresponding cylinders (see, for example, Patent Document 1). An air intake throttle valve 3, which adjusts the intake flow rate, is provided in the upstream portion of the intake passage 2, that is, in the common portion of the banks 1L, 1R. Thus, the amount of the intake air supplied to the banks 1L, 1R is adjusted by the common air intake throttle valve 3 at the same time.

However, if the diesel engine of this configuration has a great displacement, the intake flow rate changes in a wide range. It is thus difficult to accurately adjust the intake flow rate over the wide range using the air intake throttle valve provided commonly for the two banks.

For example, as shown in FIG. 5, intake passages 2L, 2R may be provided separately for the banks 1L, 1R and air intake throttle valves 3L, 3R are arranged in the corresponding intake passages 2L, 2R. This configuration narrows the adjustment range of the intake flow rate for each of the air intake throttle valves 3L, 3R to a half of the adjustment range of the intake flow rate required for the intake flow rate throttle valve provided commonly for the banks. The intake flow rate is thus adjusted accurately.

[Patent Document 1] Japanese Laid-Open Patent Publication No. 2004-124778

SUMMARY OF THE INVENTION

However, it is extremely difficult to equalize the lengths, shapes, or ambient temperatures of the intake passages 2L, 2R corresponding to the banks 1L, 1R. This makes it necessary to control operation of each of the air intake throttle valves 3L, 3R in correspondence with the condition of the associated one of the intake passages 2L, 2R. This complicates the configuration of each air intake throttle valve 3L, 3R involved in such control of operation and increases load of calculation.

Although the description so far discusses the problem of the air intake throttle valves by way of example, the problem is generally common in other actuators that change the condition of intake air flowing in an intake passage of a V-diesel engine, such as an exhaust flow rate adjusting valve of an external exhaust gas recirculating mechanism, which adjusts the amount of exhaust gas recirculated from an exhaust passage to an intake passage, or a boost pressure changing mechanism, which changes boost pressure of a supercharger.

Accordingly, it is an objective of the present invention to provide an air intake control device of a V-diesel engine that accurately changes the condition of intake air by a pair of actuators provided in an intake passage and suppresses increase of load of calculation without complicating the configuration involved in control of operation of the actuators.

To achieve the foregoing objective an air intake control device of a V diesel engine having an intake passage through which intake air is supplied to respective cylinders formed in a pair of banks of the V diesel engine, an actuator that changes the condition of the intake air flowing in the intake passage, and control means that controls operation of the actuator is provided. The intake passage includes a pair of connecting portions each connected to one of the banks, a converging portion that connects the connecting portions together, and a pair of branch portions branched from the converging portion and extending upstream. The actuator is provided in correspondence with each of the branch portions. The control means feedback controls operation of each of the actuators in accordance with a common target control value.

In this structure, the actuators are arranged in correspondence with the branch portions of the intake passage. Thus, compared to a case in which an actuator provided commonly for the two banks changes the condition of the intake flow rate, the operable range of each actuator becomes small. This allows each actuator to accurately change the condition of the intake flow rate. After the condition of the intake air is changed by the actuators, the intake air is temporarily mixed together in the converging portion of the intake passage. The intake air is then distributed to the banks through the corresponding connecting portions. This makes it unnecessary to control operation of the actuators separately. In other words, operation of the actuators is controlled in accordance with the common target control value. This prevents the structures involved in control of operation of the actuators from becoming complicated and load of calculation from increasing. The condition of the intake air includes, for example, the flow rate, pressure, and temperature of the intake flow rate, and the concentration and temperature of the recirculated exhaust gas in the intake air.

The above described air intake control device of the V diesel engine preferably has a sensor that detects the condition of the intake air flowing in the intake passage. The sensor is preferably provided in correspondence with each of the branch portions.

In this structure, the sensors are provided in correspondence with the branch portions of the intake passage. Thus, compared to a case in which a sensor provided commonly for the banks detects the condition of the intake flow rate, the detectable range of each of the sensors becomes small. This allows each sensor to accurately detect the condition of the intake air.

In the above described air intake control device of the V diesel engine, the sensor preferably includes a pair of intake flow rate sensors each arranged in one of the branch portions. The control means preferably calculates the amount of the intake air flowing in the intake passage by averaging detection values provided by the intake flow rate sensors.

In this structure, even if pulsation occurs in the intake air flowing in the branch portions and thus the detection values detected by the intake flow rate sensors become different from each other, the calculated value of the intake flow rate is prevented from being altered. Further, the amount of the intake air introduced from the branch portions to the cylinders through the converging portion and the corresponding connecting portions is accurately determined.

In the above described air intake control device of the V diesel engine, the control means preferably performs a smoothing procedure on the detection values of the intake flow rate sensors prior to the averaging procedure.

This configuration further effectively suppresses influence by the pulsation of the intake air.

In the above described air intake control device of the V diesel engine, the control means preferably feedback controls operation of the actuators in accordance with the target control value. The control means preferably further includes determining means that determines whether there is a malfunction in the actuators, and restricting means that restricts change of the condition of the intake air through a feedback control performed on one of the actuators if the determining means determines that the other one of the actuators is malfunctioning.

In this structure, if it is determined that one of the actuators is malfunctioning, adjustment of the condition of the intake air by the other one of the actuators is restricted. Excessive load acting on the functioning actuator is thus suppressed. This also prevents the banks from receiving the intake air of the condition different from one bank to the other, which is caused if the functioning one of the actuators solely changes of the condition of the intake air. Further, restriction of the change of the condition of the intake air includes prohibition of the change of the condition of the intake air through feedback control on one of the actuators if a malfunction of the other one of the actuators is detected.

In the above described air intake control device of the V diesel engine, the V diesel engine preferably further includes a pair of superchargers arranged in correspondence with the branch portions, and a pair of boost pressure changing mechanisms each changing a boost pressure of the corresponding supercharger. The boost pressure changing mechanisms serve as the actuators.

In the above described air intake control device of the V diesel engine, the restricting means preferably minimizes a supercharging efficiency by prohibiting the feedback control on the other one of the boost pressure changing mechanisms if the determining means determines that one of the boost pressure changing mechanisms is malfunctioning.

In this structure, if one of the boost pressure changing mechanisms is malfunctioning, the supercharger is prevented from receiving an excessive load due to the feedback control performed by the control means on the other one of the boost pressure changing mechanism.

The above described air intake control device of the V diesel engine preferably includes a pair of exhaust flow rate adjusting valves serving as the actuators. The exhaust flow rate adjusting valves are formed in a pair of communication lines each connecting an exhaust passage connected to the cylinders and the corresponding one of the branch portions to each other. The exhaust flow rate adjusting valves each adjust an amount of exhaust gas recirculated to the corresponding branch portions through the associated communication passage. If the determining means determines that one of the exhaust flow rate adjusting valves is malfunctioning, the restricting means fully closes the other one of the exhaust flow rate adjusting valves by prohibiting the feedback control on the exhaust flow rate adjusting valve.

In this structure, if one of the exhaust flow rate adjusting valves of the external exhaust gas recirculating mechanism is malfunctioning, the opening degree of the other one of the exhaust flow rate adjusting valves is prevented from being excessively increased due to the feedback control of such opening degree by the control means. This suppresses introduction of a great amount of recirculated exhaust gas into the branch portion corresponding to the functioning exhaust flow rate adjusting valve. Thus, the banks are prevented from receiving the intake air containing recirculated gas of a concentration greatly different from one bank to the other.

The above described air intake control device of the V diesel engine preferably includes a pair of air intake throttle valves serving as the actuators. The air intake throttle valves are formed in the corresponding branch portions. The air intake throttle valves each adjust the amount of the intake air passing through the corresponding branch portion. If the determining means determines that one of the air intake throttle valves is malfunctioning, the control means fully opens the other one of the air intake throttle valves by prohibiting the feedback control on the air intake throttle valve.

In this structure, even if one of the intake air throttle valves is malfunctioning, a maximum amount of intake air is reliably supplied to each of the banks by fully opening the other one of the intake air throttle valves. This suppresses increase of particulate matter in the exhaust gas caused by incomplete combustion.

In the above described air intake control device of the V diesel engine, the converging portion is preferably formed by a surge tank provided commonly for the banks.

By increasing the cross-sectional area of the surge tank in the intake passage compared to those of the remaining portions of the intake passage, the intake air reliably has a volume necessary for reducing pulsation of intake air. Thus, by using the surge tank provided commonly for the banks as the converging portion, the intake air flowing from the two branch portions into the converging portion is effectively mixed together. The amounts and properties of the intake air sent from the converging portion to the two connecting portions thus become equal. This reduces undesirable influence caused by differences of the amounts and properties of the intake air fed to the cylinders from one bank to the other, such as variation of the engine operating speed and aggravation of the exhaust properties. Further, compared to a case in which surge tanks are provided separately in correspondence with the respective banks, this structure is suitable for large intake air control devices.

DETAILED DESCRIPTION OF THE PREFERRED EMBODIMENTS

First Embodiment

An air intake control device of an eight-cylinder V-diesel engine according to a first embodiment of the present invention will now be described with reference to FIGS. 1 and 2.

Figure 1:
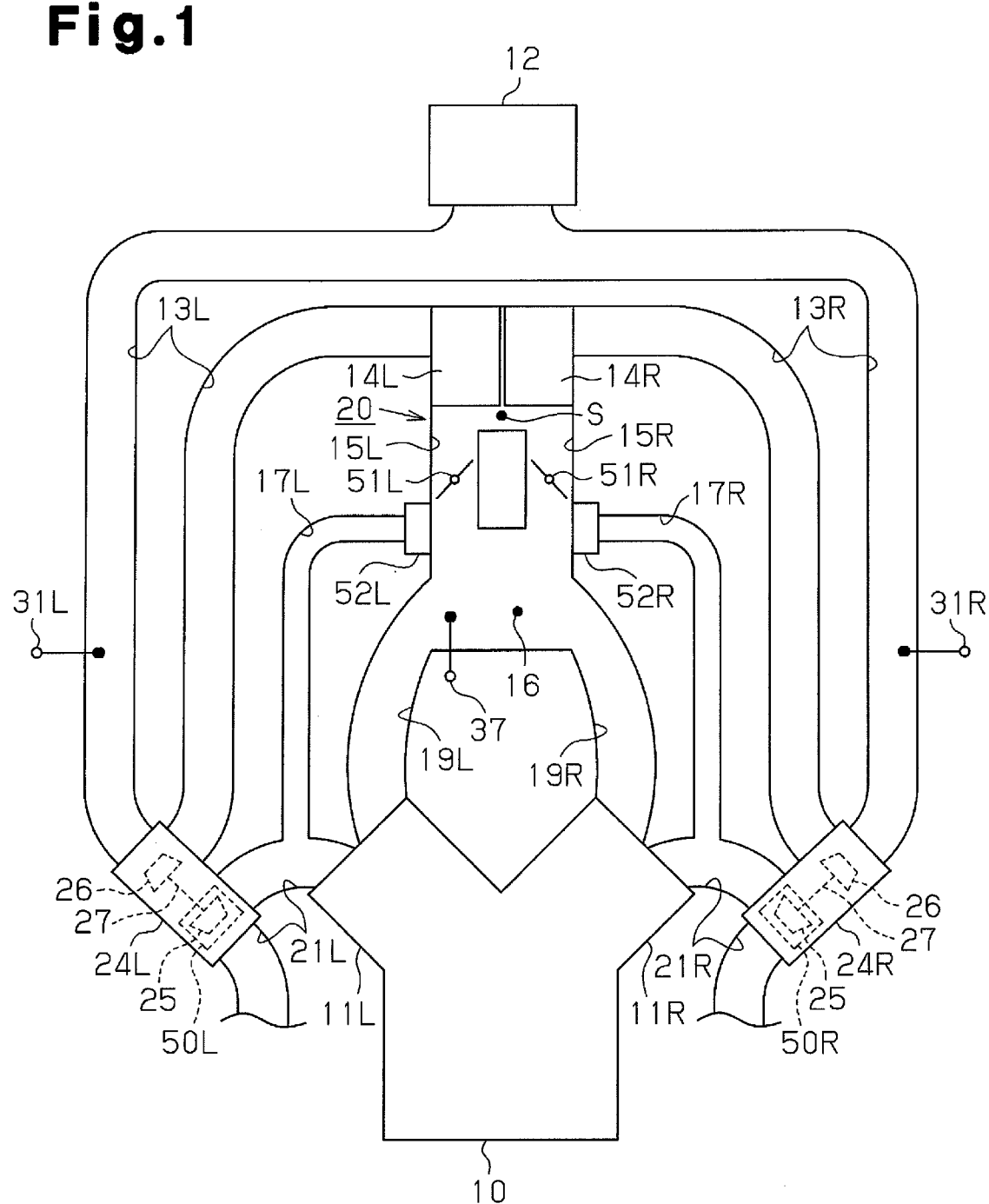
FIG. 1 is a view schematically showing the configuration of an engine and an air intake control device of the engine according to an embodiment of the present invention.

As shown in FIG. 1, an engine 10 is a V-engine, in which a pair of banks 11L, 11R are arranged in a V shape. Each of the banks 11L, 11R has four cylinders. An intake system of the engine 10 includes an air cleaner 12, a pair of intercoolers 14L, 14R, a throttle body 20, and superchargers 24L, 24R corresponding to the banks 11L, 11R. Each of the superchargers 24L, 24R is an exhaust driven type supercharger. Each supercharger 24L, 24R has a rotor 27. A compressor blade 26 and a turbine blade 25 are arranged at ends of each of the rotors 27. Each of the compressor blades 26 is arranged in the corresponding one of a pair of inlet lines 13L, 13R, which connect the corresponding intercoolers 14L, 14R to the air cleaner 12. Each of the turbine blades 25 is provided in the corresponding one of a pair of exhaust passages 21L, 21R connected to the corresponding cylinders of the banks 11L, 11R.

Each supercharger 24L, 24R uses energy produced by the exhaust gas discharged from the cylinders into the corresponding exhaust passage 21L, 21R to supercharge the intake air. In other words, each rotor 27 is rotated by the exhaust gas in the corresponding exhaust passage 21L, 21R that hits the associated turbine blade 25. This causes the corresponding compressor blade 26 to pressurize the intake air in the corresponding inlet line 13L, 13R and sends the intake air into the corresponding intercooler 14L, 14R. The inlet lines 13L, 13R have substantially equal cross-sectional areas and lengths. The compressor blades 26 are located substantially at the same positions in the inlet lines 13L, 13R.

Each supercharger 24L, 24R has a boost pressure changing mechanism 50L, 50R. Each of the boost pressure changing mechanisms 50L, 50R has a nozzle (not shown) through which the exhaust gas is blasted onto the corresponding one of the turbine blades 25 and a motor (not shown) that changes the opening degree of the nozzle. Each boost pressure changing mechanism 50L, 50R adjusts the opening degree of the nozzle and thus changes the boost pressure. The boost pressure changes in correspondence with the flow velocity (more correctly, momentum) of the exhaust gas hitting the turbine blade 25. Thus, as the flow velocity of the exhaust gas changes in correspondence with the engine operating state, the boost pressure changes. If the engine 10 is operated in a low load and low rotation range, the flow velocity of the exhaust gas is small and the rotational speed of each rotor 27 is low. The boost pressure thus becomes low. Contrastingly, if the engine 10 is operated in a high load and high rotation range, the flow velocity of the exhaust gas is great and the rotational speed of each rotor 27 is high. The boost pressure thus becomes high.

Thus, when the increase of the boost pressure and the improvement of supercharging response in the low load and low rotation range are required, each boost pressure changing mechanism 50L, 50R reduces the opening degree of the corresponding nozzle to increase the flow velocity of the exhaust gas hitting the associated turbine blade 25. This increases the boost pressure and improves supercharging response. Contrastingly, when the engine 10 is operated in the high load and high rotation range, the boost pressure changing mechanism 50L, 50R increases the opening degree of the nozzle to decrease the flow velocity of the exhaust gas hitting the turbine blade 25. This suppresses excessive rotation of the rotor 27 and excessive rise of boost pressure.

The intake air supercharged by each supercharger 24L, 24R is supplied to the corresponding intercooler 14L, 14R through the associated inlet line 13L, 13R. The intercooler 14L, 14R cools the intake air, which has been heated through compression by the supercharger 24L, 24R. The intake air is then introduced into the throttle body 20. The two superchargers 24L, 24R and the two boost pressure changing mechanisms 50L, 50R exhibit substantially the same boost characteristics and boost pressure changing characteristics. The intercoolers 14L, 14R have substantially identical configurations.

The throttle body 20 has a pair of branch lines 15L, 15R, a pair of air intake throttle valves 51L, 51R provided in the corresponding branch lines 15L, 15R, and a converging line 16, which is downstream from the branch lines 15L, 15R. After flowing from the intercoolers 14L, 14R into the throttle body 20, the intake air is distributed to the branch lines 15L, 15R by substantially equal amounts. The intake air is then sent to the converging line 16 through the air intake throttle valves 51L, 51R. The converging line 16 functions as a surge tank provided commonly for the banks 11L, 11R. The cross-sectional area of the converging line 16 is greater than the cross-sectional area of each branch line 15L, 15R. The converging line 16 ensures a volume necessary for decreasing pulsation of the intake air.

Thus, even if there are differences in the temperature, the pressure, and the state of pulsation between the intake air flowing from the air intake throttle valve 51L into the converging line 16 and the intake air flowing from the air intake throttle valve 51R into the converging line 16, such differences between the condition of the intake air from the air intake throttle valve 51L and the condition of the intake air from the air intake throttle valve 51R are eliminated by temporarily mixing the intake air together in the converging line 16. That is, the intake air is mixed substantially homogeneously. The branch lines 15L, 15R have substantially equal flow passage areas and lengths. The air intake throttle valves 51L, 51R are located substantially at the same positions in the branch lines 15L, 15R. Further, the opening/closing speeds of the air intake throttle valves 51L, 51R and the opening degrees of the air intake throttle valves 51L, 51R in the fully open/closed states are substantially equal.

In the first embodiment, with reference to FIG. 1, a communicating portion S, which connects the branch lines 15L, 15R to each other, is provided in the throttle body 20 at a position upstream from the branch lines 15L, 15R. Some of the intake air flowing from the intercoolers 14L, 14R is mixed together in the communicating portion S before being distributed to the branch lines 15L, 15R. In this manner, the above-described differences in the condition of the intake air are eliminated to a certain extent before the intake air is distributed to the branch lines 15L, 15R. The communicating portion S may be omitted as long as the converging line 16 operates to eliminate the differences in the condition between the intake air flowing into the branch line 15L and the intake air flowing into the branch line 15R. In the first embodiment, the converging line 16 operates to mix the intake air from the branch line 15L with the intake air from the branch line 15R, thus eliminating the differences in the condition between the intake air from the branch line 15L and the intake air from the branch line 15R. Mixing of the intake air in the communicating portion S is thus performed as an auxiliary operation.

A pair of distributing lines 19L, 19R (intake manifolds) are connected to the converging line 16. The downstream side of one of the distributing lines 19L, 19R is branched toward the cylinders of the left bank 11L, as viewed in FIG. 1, and connected to the cylinders of the bank 11L. The downstream side of the other of the distributing lines 19L, 19R is branched toward and connected to the cylinders of the right bank 11R, as viewed in FIG. 1. The branch lines 19L, 19R have substantially equal flow passage areas and passage lengths and substantially identical shapes. Thus, after being homogenously mixed in the converging line 16, the intake air is introduced into the branch lines 19L, 19R by substantially equal amounts while being maintained in the homogeneous state. The intake air that has been sent to the branch lines 19L, 19R is distributed to the cylinders of the corresponding banks 11L, 11R by uniform amounts.

The intake system of the engine 10 includes an external exhaust gas recirculating mechanism, which recirculates some of the exhaust gas from the exhaust passages 21L, 21R to the branch lines 15L, 15R (EGR). The external exhaust gas recirculating mechanism has a pair of recirculating lines 17L, 17R and a pair of exhaust flow rate adjusting valves 52L, 52R, which are provided in the corresponding recirculating lines 17L, 17R. The recirculating line 17L connects the exhaust passage 21L upstream from the supercharger 24L and the branch line 15L downstream from the air intake throttle valve 51L to each other. The recirculating line 17R connects the exhaust passage 21R upstream from the supercharger 24R and the branch line 15R downstream from the air intake throttle valve 51R to each other. The exhaust flow rate adjusting valve 52L is provided at the most downstream position in the recirculating line 17L, which is the connecting portion between the recirculating line 17L and the branch line 15L. The exhaust flow rate adjusting valve 52R is provided at the most downstream position in the recirculating line 17R, which is the connecting portion between the recirculating line 17R and the branch line 15R.

The external exhaust gas recirculating mechanism operates to return some of the exhaust gas from each exhaust passage 21L, 21R to the corresponding branch line 15L, 15R through the associated recirculating line 17L, 17R, using negative intake pressure generated at a position downstream from the corresponding air intake throttle valve 51L, 51R in the branch line 15L, 15R. Each of the exhaust flow rate adjusting valves 52L, 52R is an electromagnetic valve driven by a motor (not shown). As the motor runs and the opening degree of each exhaust flow rate adjusting valve 52L, 52R is adjusted, the amount of the exhaust gas returned from the exhaust passage 21L, 21R to the branch line 15L, 15R, or the amount of recirculated gas, is adjusted.

Like the exhaust flow rate adjusting valves 52L, 52R, each of the air intake throttle valves 51L, 51R is an electromagnetic valve driven by a motor (not shown). As the motor operates and the opening degree of each air intake throttle valve 51L, 51R is changed, the total amount of the intake air led from the corresponding branch line 15L, 15R to the converging line 16, or the total amount of the intake air distributed from the converging line 16 to the cylinders through the distributing line 19L, 19R, is adjusted.

In the diesel engine 10, the amount of the intake air regulated by each air intake throttle valve 51L, 51R is adjusted in such a manner as to suppress increase of particulate matter (PM) in the exhaust gas. Specifically, as the amount of intake air becomes excessively short compared to the amount of injected fuel, the fuel burns incompletely and thus increases the amount of the particulate matter in the exhaust gas. The opening degree of each air intake throttle valve 51L, 51R is thus adjusted to ensure a desired amount of intake air in correspondence with the operating state of the engine, which is represented by, for example, the fuel injection amount.

The opening degree of each air intake throttle valve 51L, 51R is adjusted to ensure optimal adjustment of the intake flow rate and optimal recirculation of the exhaust gas by the external exhaust gas recirculating mechanism. If the opening degree of each exhaust flow rate adjusting valve 52L, 52R is fixed, negative pressure produced downstream from the air intake throttle valve 51L, 51R increases as the opening degree of the air intake throttle valve 51L, 51R decreases. This increases the amount of the recirculated gas recirculated from the corresponding exhaust passage 21L, 21R to the branch line 15L, 15R. Contrastingly, the negative pressure decreases as the opening degree of the air intake throttle valve 51L, 51R increases. As a result, the amount of the recirculated gas is reduced. That is, the amount of the recirculated exhaust gas changes in correspondence with the negative pressure, which varies depending on the opening degree of each air intake throttle valve 51L, 51R, and the opening degree of each exhaust flow rate adjusting valve 52L, 52R. In the first embodiment, the opening degree of the air intake throttle valve 51L, 51R is first decreased to a level at which the particulate matter in the exhaust gas is prevented from increasing. Then, while negative intake pressure is maintained at a sufficient level, the opening degree of the exhaust flow rate adjusting valve 52L, 52R is feedback controlled in correspondence with the engine operating state represented by, for example, the boost pressure and the intake flow rate. In this manner, the amount of the recirculated exhaust gas is adjusted to an optimal level.

Figure 2:
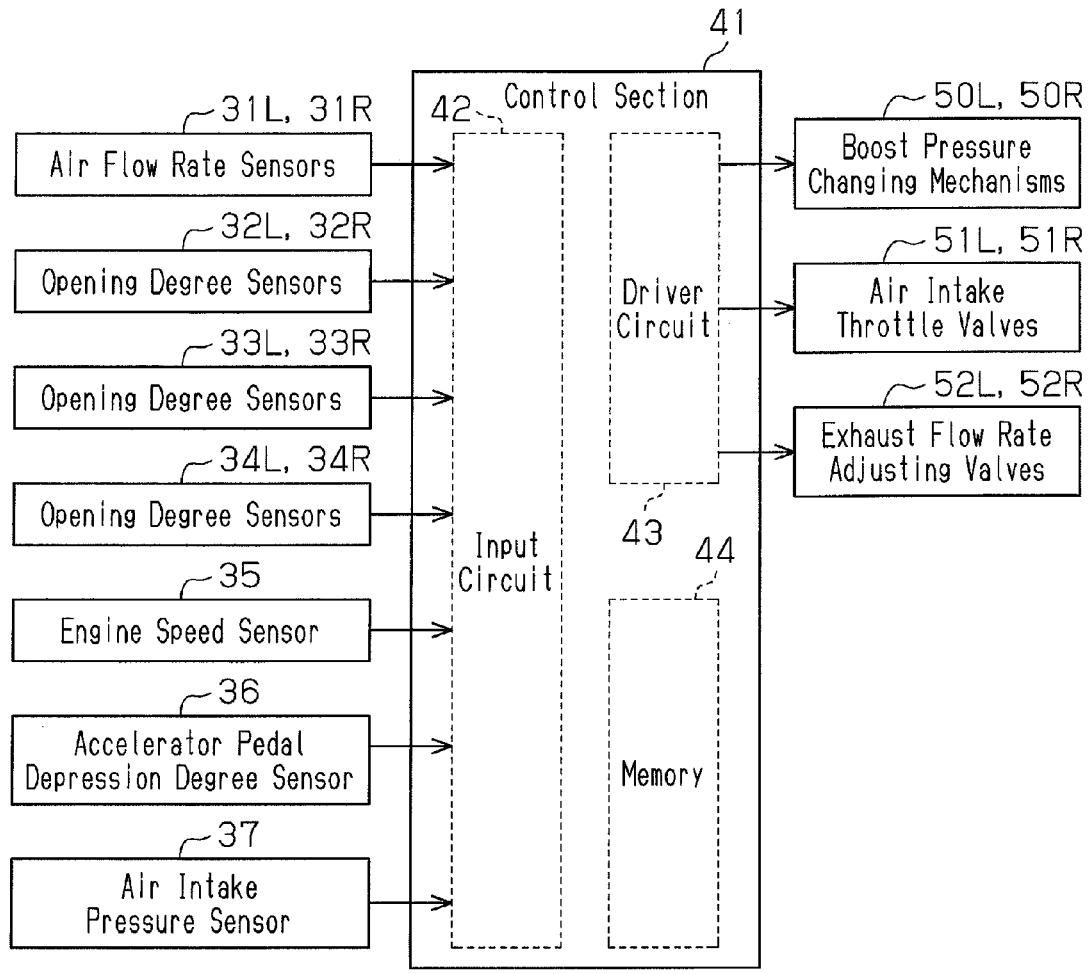
FIG. 2 is a block diagram representing the configuration of a control section of the air intake control device, that of a sensor, and that of an actuator.

As illustrated in FIG. 2, the engine 10 has a control section 41, which performs various procedures of the air intake control device. The engine 10 also has sensors 31L, 31R to 34L, 34R, and 35 to 37, which detect information of the engine operating state required in the procedures of the control section 41, and actuators 50L, 50R to 52L, and 52R, operation of which are controlled by the control section 41. The control section 41 has a memory 44, an input circuit 42, and a driver circuit 43. The memory 44 stores data necessary for the procedures. The input circuit 42 receives detection signals from the sensors and converts the detection signals from analog signals to digital signals as needed. The driver circuit 43 drives the actuators. In the first embodiment, the actuators include the air intake throttle valves 51L, 51R, the exhaust flow rate adjusting valves 52L, 52R, or the boost pressure changing mechanisms 50L, 50R.

Opening degree sensors 32L, 32R that detect the opening degrees of the corresponding air intake throttle valves 51L, 51R are provided in the vicinities of the air intake throttle valves 51L, 51R. Opening degree sensors 33L, 33R that detect the opening degrees of the corresponding exhaust flow rate adjusting valves 52L, 52R are provided in the exhaust flow rate adjusting valves 52L, 52R. Opening degree sensors 34L, 34R that detect nozzle opening degrees in correspondence with the rotational angles of the motors are arranged in the corresponding boost pressure changing mechanisms 50L, 50R. Intake flow rate sensors 31L, 31R, which detect the intake flow rates in the corresponding inlet lines 13L, 13R, are provided upstream from the associated superchargers 24L, 24R in the inlet lines 13L, 13R. The engine 10 also includes an engine speed sensor 35 detecting the engine speed, an accelerator pedal depression degree sensor 36 detecting the opening degree of the accelerator, and an air intake pressure sensor 37 detecting the air intake pressure (the boost pressure) in the converging line 16.

The sensors are electrically connected to the input circuit 42 of the control section 41. The control section 41 receives detection signals from the sensors through the input circuit 42. In correspondence with the detection signals of the sensors, the control section 41 sets target control values for the actuators of the intake system, such as the air intake throttle valves 51L, 51R, the exhaust flow rate adjusting valves 52L, 52R, and the boost pressure changing mechanisms 50L, 5R. The control section 41 performs feedback control on the actuators with reference to the set target control values.

A procedure of the feedback control carried out on the actuators of the intake system will hereafter be explained with reference to FIG. 3. The procedure is performed by the control section 41 at predetermined control cycles.

Figure 3:
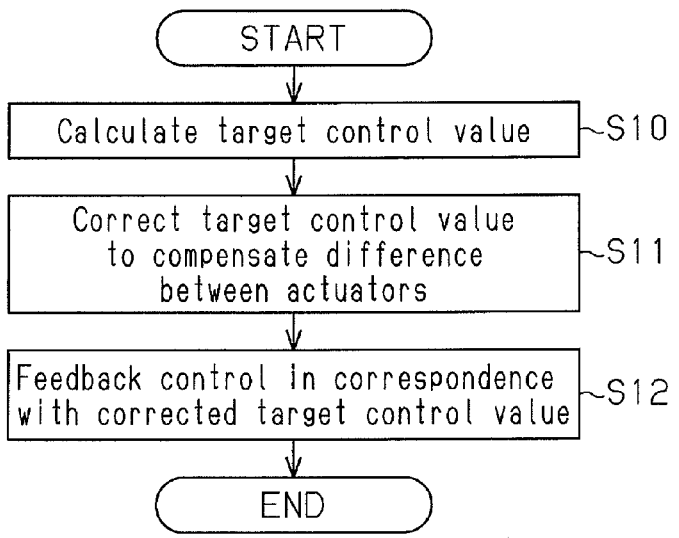
FIG. 3 is a flowchart representing a procedure for performing feedback control on the actuator.
Figure 4:
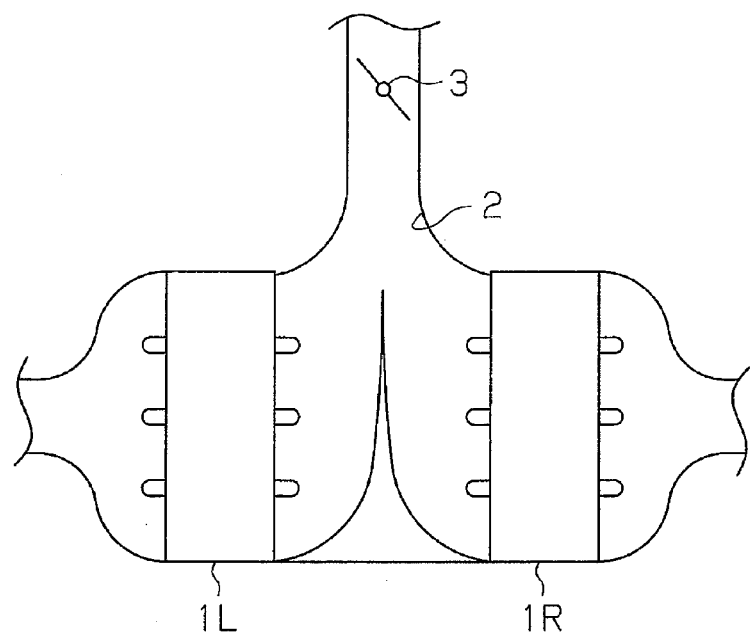
FIG. 4 is a view schematically showing the configuration of a conventional air intake control device of a V-diesel engine.
Figure 5:
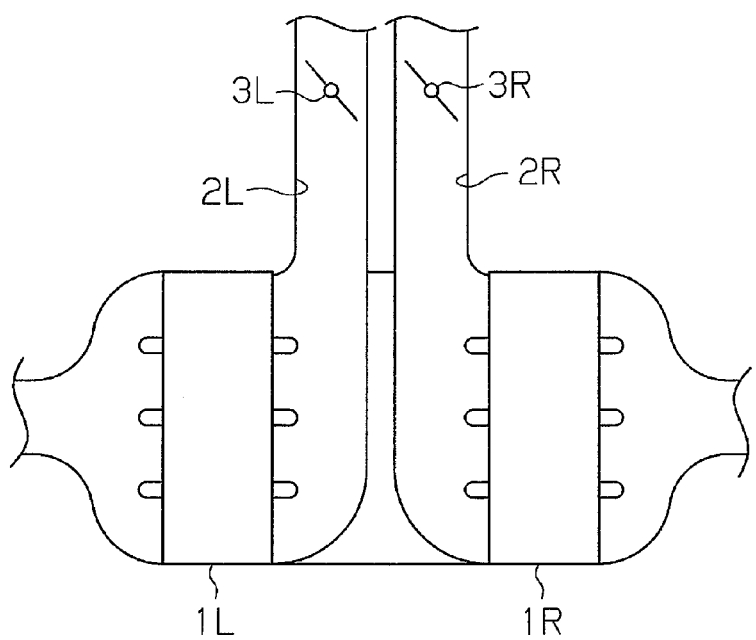
FIG. 5 is a view schematically showing the configuration of another conventional air intake control device of a V-diesel engine.

As illustrated in FIG. 3, the target control values of the actuators, which changes the condition of the intake air, which includes the intake flow rate, the recirculated exhaust flow rate, and the boost pressure is changed, are calculated (step S10).

Specifically, a target opening degree of each air intake throttle valve 51L, 51R is obtained in correspondence with the accelerator pedal depression degree and the engine speed. If the intake flow rate falls excessively short with respect to the fuel injection amount, the fuel burns incompletely and the particulate matter in the exhaust gas increases. In contrast, if the opening degree of each air intake throttle valve 51L, 51R is increased to raise the intake flow rate, the negative pressure decreases, which makes it difficult to accomplish exhaust gas recirculation suitable for the engine operating state. Thus, the target opening degree of the air intake throttle valve 51L, 51R is set in such a range that the amount of the particulate matter in the exhaust gas is negligible and a negative pressure ensuring optimal exhaust gas recirculation is maintained. The thus set target control value is common for the air intake throttle valves 51L, 51R. That is, operation of the air intake throttle valve 51L and that of the air intake throttle valve 51R are controlled in accordance with the common target control value.

A target opening degree of each exhaust flow rate adjusting valve 52L, 52R is calculated in correspondence with the accelerator pedal depression degree, the engine speed, the boost pressure, and the intake flow rate, in such a manner that the exhaust gas is recirculated by an amount optimal for the engine operating state. The obtained target opening degree is common for the exhaust flow rate adjusting valves 52L, 52R. In other words, operation of the exhaust flow rate adjusting valve 52L and that of the exhaust flow rate adjusting valve 52R are controlled in accordance with the common target control value. A target nozzle opening degree of each boost pressure changing mechanism 50L, 50R is calculated in correspondence with the accelerator pedal depression degree, the engine speed, and the boost pressure in such a manner that a boost pressure optimal for the engine operating state is obtained. The determined target nozzle opening degree is common for the boost pressure changing mechanisms 50L, 50R. That is, operation of the boost pressure changing mechanism 50L and that of the boost pressure changing mechanism 50R are controlled in accordance with the common target control value.

The intake flow rate sensors 31L, 31R are arranged in the corresponding inlet lines 13L, 13R. This provides two values obtained by the intake flow rate sensors 31L, 31R as detection values of the intake flow rate. As has been described, the flow passage areas and lengths of the inlet lines 13L, 13R are substantially equal. Thus, basically, there is no significant difference between the two detection values. However, since explosion takes place intermittently in each of the cylinders, the rotation speed of the rotor 27 of the corresponding supercharger 24L, 24R actually fluctuates. This causes pulsation of the intake air in such a manner that the detection values of the intake flow rate become different from each other.

To solve this problem, in the first embodiment, the detection values are first smoothed using the following expressions (1) and (2). Then, the average value QA of the smoothed values is determined using the expression (3). For example, in calculation of the target opening degree of each exhaust flow rate adjusting valve 52L, 52R in correspondence with the intake flow rate, the obtained average value QA is used as a value of the intake flow rate.

$$Q1(i) \leftarrow Q1(i)/n + Q1(i-1) \times (n-1)/n \quad (1)$$

$$Q2(i) \leftarrow Q2(i)/n + Q2(i-1) \times (n-1)/n \quad (2)$$

$$QA \leftarrow (Q1(i) + Q2(i))/2 \quad (3)$$

In the expressions (1) and (2), "Q1" represents a detection value obtained by the intake flow rate sensor 31L, and "Q2" represents a detection value provided by the intake flow rate sensor 31R. The suffixes "(i)" and "(i−1)" represent a detection value of a current control cycle and a detection value of a previous control cycle, respectively. "n" is a constant (an integer not less than "1"), in accordance with which the level of smoothing is determined. The greater the constant n, the more smoothed change of the detection value caused by the pulsation of the intake air becomes. However, if the constant n is excessively great, responsiveness of the detection values lowers with respect to change of the intake flow rate in a transient operating state. Thus, the constant n is determined considering the responsiveness of the detection values and the extent of the pulsation of the intake air comprehensively.

After the target control value of each actuator is calculated in this manner, the target control value is corrected to compensate the difference between the actuators (step S11). Specifically, such correction is carried out using the following expressions (4) and (5).

$$\theta t1 \leftarrow \theta t + K1 \times \Delta\alpha1 \quad (4)$$

$$\theta t2 \leftarrow \theta t + K2 \times \Delta\alpha2 \quad (5)$$

In the expressions (4) and (5), "$\Delta\alpha1$" represents the constant difference ($=\theta t - \theta a$) between the actual opening degree $\theta a$ and the target opening degree $\theta t$ of one of the air intake throttle valves 51L, 51R. "$\Delta\alpha2$" represents the constant difference ($=\theta t - \theta a$) between the actual opening degree $\theta a$ and the target opening degree $\theta t$ of the other one of air intake throttle valves 51L, 51R. The values "K1" and "K2" are constants. The target opening degree $\theta t1$ of the air intake throttle valve 51L and the target opening degree $\theta t2$ of the air intake throttle valve 51R are set through such correction. The goal of such correction is to compensate the difference between the air intake throttle valves 51L, 51R, but not to change the target opening degree of each air intake throttle valve 51L, 51R. In other words, the correction does not regulate the opening degrees of the air intake throttle valves 51L, 51R to different values. Although the description so far has focused on the correction of the target opening degree of each air intake throttle valve 51L, 51R by way of example, the target opening degree of each exhaust flow rate adjusting valve 52L, 52R and the target nozzle opening degree of each boost pressure changing mechanism 50L, 50R are corrected in the same manner.

After the correction is performed to compensate the difference between the actuators, the control section 41 performs feedback control on the actuators in such a manner that the target control values match the corresponding actual values detected by the sensors (step S12). This gradually changes the opening degree of each of the air intake throttle valves 51L, 51R, the opening degree of each of the exhaust flow rate adjusting valves 52L, 52R, and the nozzle opening degree of each of the boost pressure changing mechanisms 50L, 50R in such a manner that these values approximate to the corresponding target values. In this manner, the condition of the intake air such as the intake flow rate, the amount of recirculated exhaust gas, and the boost pressure is controlled in correspondence with the engine operating state. As a result, while suppressing generation of PM and NOx and thus maintaining exhaust gas properties in a favorable state, effective output of the engine is ensured.

The first embodiment has the following advantages.

(1) The actuators such as the air intake throttle valves 51L, 51R, the exhaust flow rate adjusting valves 52L, 52R of the external exhaust gas recirculating mechanism, and the boost pressure changing mechanisms 50L, 50R of the superchargers 24L, 24R are arranged upstream from the converging line 16 in the intake passage, or in correspondence with the inlet lines 13L, 13R and the branch lines 15L, 15R. This narrows the operable range of each actuator compared to a case in which the condition of the intake flow rate is changed by an actuator provided commonly for the banks 11L, 11R. Thus, each of the actuators is allowed to accurately change the condition of the intake flow rate, including the intake flow rate, the amount of recirculated exhaust gas, and the boost pressure. After the condition of the intake air is changed by the corresponding actuators, the intake air is temporarily mixed together in the converging line 16 and then distributed to the banks 11L, 11R through the corresponding distributing lines 19L, 19R. It is thus unnecessary to control operation of the actuators separately from one another. In other words, the actuators are operated in accordance with the common target control values. This suppresses complication of the structures involved in control of operation of the actuators and prevents increase of the load of calculation.

(2) Particularly, the intake flow rate sensors 31L, 31R are provided in the corresponding inlet lines 13L, 13R. Thus, compared to a case in which the intake flow rate is detected by a sensor provided commonly for the banks 11L, 11R, the detectable range of each intake flow rate sensor 31L, 31R is narrowed. This allows the intake flow rate sensors 31L, 31R to accurately detect the intake flow rate.

(3) The intake flow rate is obtained by averaging the detection values of the intake flow rate sensors 31L, 31R. Thus, even if pulsation occurs in the intake air flowing in the branch lines 15L, 15R, the calculated value of the intake flow rate is prevented from being changed by the pulsation. Besides, the amount of the intake air fed from each branch line 15L, 15R to the corresponding cylinders via the converging line 16 and the associated distributing line 19L, 19R is accurately calculated.

(4) The detection values are subjected to a smoothing procedure prior to averaging of the detection values of the intake flow rate. This further effectively suppresses influence by pulsation of the intake air.

(5) The converging line 16, which connects the branch lines 15L, 15R to each other, is formed as a common surge tank for the banks 11L, 11R. This increases the flow passage area of the converging line 16. The intake air introduced from the branch lines 15L, 15R to the converging line 16 is thus further effectively mixed together. The amounts and the properties of the intake air flowing from the converging line 16 to the distributing lines 19L, 19R thus become substantially equal. This reduces the extent of undesirable influence caused by different amounts and properties of the intake air fed to the cylinders between the banks 11L, 11R, which includes variation of the engine speed or aggravation of the exhaust gas properties. Further, compared to a case in which surge tanks are provided separately for the banks 11L, 11R, the illustrated configuration is favorable in a case in which the air intake control device is enlarged.

Second Embodiment

A second embodiment of the present invention will hereafter be explained. In the first embodiment, the exhaust flow rate adjusting valves 52L, 52R, the boost pressure changing mechanisms 50L, 50R, and the air intake throttle valves 51L, 51R are feedback controlled in such a manner as to adjust the amount of recirculated exhaust gas, the boost pressure, and the intake flow rate to suitable values in correspondence with the engine operating state. However, if a malfunction occurs in one of the exhaust flow rate adjusting valves 52L, 52R but the feedback control is continuously carried out, the following problem may occur.

Specifically, if the opening degree of one of the exhaust flow rate adjusting valves 52L, 52R becomes unchangeable, the opening degree of the other, or the normally functioning one, of the exhaust flow rate adjusting valves 52L, 52R may become excessively great. In this case, a great amount of recirculated exhaust gas is introduced into the corresponding one of the branch lines 15L, 15R. This causes a great difference in the concentration of the recirculated exhaust gas between the intake air supplied to the bank 11L and the intake air fed to the bank 11R. Further, if one of the boost pressure changing mechanisms 50L, 50R malfunctions, excessive rotation of the rotor 27 occurs in the other, or the normally functioning one, of the boost pressure changing mechanisms 50L, 50R, resulting in excessive rotation of the associated rotor 27, which causes excessive load acting on the associated supercharger. Also, if one of the air intake throttle valves 51L, 51R malfunctions, the opening degree of the other, or the normally functioning one, of the intake air throttle valves is not increased to match great increase, if any, of the required value of the intake flow rate. The intake flow rate thus becomes insufficient. As a result, incomplete combustion of fuel is brought about and particulate matter in the exhaust gas is increased.

To solve this problem, in the second embodiment, the control section 41 performs failsafe control for a case in which a malfunction occurs in any one of the exhaust flow rate adjusting valves 52L, 52R, the boost pressure changing mechanisms 50L, 50R, and the air intake throttle valves 51L, 51R, in addition to the above-described feedback control.

[Failsafe Control of Exhaust Flow Rate Adjusting Valves]

In the failsafe control, it is determined whether a malfunction has occurred in the exhaust flow rate adjusting valves 52L, 52R. Specifically, if at least one of the following conditions (1) and (2) is met, it is determined that at least one of the exhaust flow rate adjusting valves 52L, 52R is malfunctioning.

(1) The difference between the target opening degree of the exhaust flow rate adjusting valves 52L, 52R and the actual opening degree detected by each of the opening degree sensors 33L, 33R remains greater than or equal to a predetermined value continuously for a predetermined time.

(2) The difference between the two intake flow rates detected by the intake flow rate sensors 31L, 31R remains greater than or equal to a predetermined value continuously for a predetermined time.

If one of the exhaust flow rate adjusting valves 52L, 52R malfunctions, different amounts of recirculated exhaust gas are supplied to the branch lines 15L, 15R. This causes a difference between the amount of the intake air flowing in the inlet line 13L and the amount of the intake air flowing in the inlet line 13R. Such difference is monitored in accordance with the condition (2) through the above-described determination of a malfunction. The condition (2) can be satisfied if, for example, a foreign object is caught by the wall of the opening of either or each of the exhaust flow rate adjusting valves 52L, 52R and hampers normal recirculation of exhaust gas, despite the fact that the exhaust flow rate adjusting valves 52L, 52R are operating. It is thus determined that there is a malfunction.

If it is determined that at least one of the exhaust flow rate adjusting valves 52L, 52R is malfunctioning, the feedback control on the exhaust flow rate adjusting valves 52L, 52R is suspended and the target opening degree of the exhaust flow rate adjusting valves 52L, 52R is set to the minimum value.

This fully closes the normally functioning one of the exhaust flow rate adjusting valves 52L, 52R. In this manner, when only one of the flow rate adjusting valves 52L, 52R is subjected to the feedback control, the opening degree of the one of the exhaust flow rate adjusting valves 52L, 52R is prevented from becoming excessively great due to the feedback control. This suppresses introduction of a great amount of recirculated exhaust gas into the corresponding one of the branch lines 15L, 15R, that is, prevents a great difference in the concentration of the recirculated exhaust gas between the intake air sent to the bank 11L and the intake air fed to the bank 11R.

[Failsafe Control of Boost Pressure Changing Mechanisms]

In this failsafe control, it is first determined whether there is a malfunction in the boost pressure changing mechanisms 50L, 50R. Specifically, if at least one of the following conditions (1) and (2) is met, it is determined that at least one of the boost pressure changing mechanisms 50L, 50R is malfunctioning.

(1) The difference between the target nozzle opening degree of the boost pressure changing mechanisms 50L, 50R and the actual nozzle opening degree detected by each of the opening degree sensors 34L, 34R remains greater than or equal to a predetermined value continuously for a predetermined time.

(2) The difference between the two intake flow rates detected by the intake flow rate sensors 31L, 31R remains greater than or equal to a predetermined value continuously for a predetermined time.

If one of the boost pressure changing mechanisms 50L, 50R is malfunctioning, the amount of the intake air flowing in the inlet line 13L becomes different from the amount of the intake air flowing in the inlet line 13R. Such difference is monitored in accordance with the condition (2) in the above-described determination of a malfunction. The condition (2) is satisfied if, for example, a foreign object is caught by the wall of the nozzle opening of either or each of the boost pressure changing mechanisms 50L, 50R and hampers normal supercharging, despite the fact that the nozzles of the boost pressure changing mechanisms 50L, 50R are normally operating. It is thus determined that there is a malfunction.

If it is determined that at least one of the boost pressure changing mechanisms 50L, 50R is malfunctioning, the feedback control on the boost pressure changing mechanisms 50L, 50R is stopped and the target nozzle opening degree of the boost pressure changing mechanisms 50L, 50R is set to the maximum value. As a result, the supercharging efficiency of the normally functioning one of the boost pressure changing mechanisms 50L, 50R becomes minimum. Accordingly, when only one of the boost pressure changing mechanisms 50L, 50R is subjected to the feedback control, the one of the boost pressure changing mechanisms 50L, 50R is prevented from receiving an excessive load. Thus, excessive rotation of the rotors 27 and damages to the superchargers 24L, 24R are prevented.

[Failsafe Control of Air Intake Throttle Valves]

In the failsafe control, it is first determined whether there is a malfunction in the air intake throttle valves 51L, 51R. Specifically, if at least one of the following conditions (1) and (2) is satisfied, it is determined that at least one of the air intake throttle valves 51L, 51R is malfunctioning.

(1) The difference between the target opening degree of the air intake throttle valves 51L, 51R and the actual opening degree detected by each of the opening degree sensors 32L, 32R remains greater than or equal to a predetermined value continuously for a predetermined time.

(2) The difference between the two detection values obtained by the intake flow rate sensors 31L, 31R remains greater than or equal to a predetermined value continuously for a predetermined time.

If one of the air intake throttle valves 51L, 51R is malfunctioning, the amount of the intake air flowing in the inlet line 13L becomes different from the amount of the intake air flowing in the inlet line 13R. Such difference is monitored in correspondence with the condition (2) in the above-described determination of a malfunction. The condition (2) is met if a foreign object is caught by the wall of the opening of either or each of the air intake throttle valves 51L, 51R and hampers normal recirculation of exhaust gas, despite the fact that the air intake throttle valves 51L, 51R are operating. It is thus determined that there is a malfunction.

If it is determined that at least one of the air intake throttle valves 51L, 51R is malfunctioning, the feedback control on the air intake throttle valves 51L, 51R is suspended and the target opening degree of the air intake throttle valves 51L, 51R is set to the maximum value. As a result, the normally functioning one of the air intake throttle valves 51L, 51R becomes fully open. A sufficient amount of intake air is thus supplied to the engine 10. This prevents incomplete combustion and a resulting increase of particulate matter in the exhaust gas.

If a malfunction occurs in the air intake throttle valves 51L, 51R and it is likely that the amount of the intake air falls short, the exhaust flow rate adjusting valves 52L, 52R are fully closed in addition to the above-described procedures. This stops recirculation of exhaust gas by the external exhaust gas recirculating mechanisms. In this manner, shortage of the intake flow rate is further effectively suppressed. Also, the amounts of recirculated exhaust gas fed into the branch lines 15L, 15R is prevented from becoming different from one branch line to the other. This prevents the concentrations of recirculated exhaust gas in the intake air fed to the banks 11L, 11R from becoming greatly different from one bank to the other.

The illustrated embodiments may be modified in the following manners.

In the second embodiment, if one of the two above-described conditions (1) and (2) is satisfied, it is determined that there is a malfunction in the boost pressure changing mechanisms 50L, 50R or the air intake throttle valves 51L, 51R or the exhaust flow rate adjusting valves 52L, 52R. However, such determination may be carried out using only one of the condition (1) and the condition (2).

In the second embodiment, the failsafe control procedures to deal with malfunctions in the boost pressure changing mechanisms 50L, 50R, the air intake throttle valves SL, 51R, and the exhaust flow rate adjusting valves 52L, 52R are performed. However, at least one of these failsafe control procedures to deal with a malfunction of the corresponding actuators may be carried out.

Prior to averaging the actual values of the intake flow rate, the actual values are subjected to the smoothing procedure. However, as long as pulsation of the intake air in the inlet lines 13L, 13R is negligible, the smoothing procedure may be omitted. Alternatively, in the smoothing procedure, for example, filtering using various types of high-pass filters or moving average calculation may be performed other than the calculation represented by the expression (1). Further, in the averaging procedure, geometric average calculation, for example, may be performed instead of the arithmetic average calculation represented by the expression (3).

The boost pressure changing mechanisms 50L, 50R of the superchargers 24L, 24R each change the nozzle opening degree in correspondence with the engine operating state. This changes the flow velocity of the exhaust gas blasted against the turbine wheel, thus adjusting the boost pressure. However, the present invention is not restricted to such boost pressure changing mechanisms. Further, instead of exhaust driven type superchargers, mechanisms that change the boost pressure using the output shaft of the engine may be employed as the superchargers 24L, 24R.

In the description so far, the feedback control is carried out on the actuators of the intake system, such as the air intake throttle valves 51L, 51R, the boost pressure changing mechanisms 50L, 50R, and the boost pressure mechanisms, by way of example. However, as long as improved control accuracy is ensured, some or all of the actuators may be open-controlled.

Although the actuators of the illustrated embodiments use the motors as the drive sources, other drive sources such as pneumatic pressure or hydraulic pressure may be used.

The engine 10 has the two superchargers 24L, 24R in correspondence with the banks 11L, 11R. However, the engine 10 may include one supercharger corresponding to only one of the banks 11L, 11R.

Intake air temperature sensors may be provided in correspondence with the inlet lines 13L, 13R as additional sensors that detect the condition of the intake air. Detection values of the intake air temperature are subjected to calculation similar to the calculation performed on the detection values of the intake flow rate. The detection values are thus used in various types of control performed on the intake system.

If a malfunction is detected in one of the boost pressure changing mechanisms 50L, 50R, the nozzle opening degree of the other one of the boost pressure changing mechanisms 50L, 50R is changed to a fully open level to prohibit supercharging of the intake air. However, the target value of the boost pressure may be set to a value lower than normal, for example, in such a manner as to restrict, not completely prohibit, the supercharging. Further, the target value of the amount of the recirculated exhaust gas may be set to a value lower than normal, for example, in such a manner as to restrict, not completely prohibit, recirculation of exhaust gas. Also, if any one of the actuators (the boost pressure changing mechanisms 50L, 50R or the air intake throttle valves 51L, 51R or the exhaust flow rate adjusting valves 52L, 52R) is malfunctioning, the normally functioning one of the actuators may be operated continuously, in such a manner as to adjust the intake flow rate or supercharge the intake pressure or recirculate the exhaust gas.

For example, an engine may include cooling devices, which are provided in both banks 11L, 11R to cool recirculated exhaust gas flowing in corresponding recirculating passages. The engine regulates the temperature of the recirculated exhaust gas by adjusting cooling efficiency of the cooling devices. In such an engine, operation of the cooling devices may be controlled in the same manner as the above-described manner, in which the actuators are operated. In this case, each of the cooling devices is an actuator that changes the condition of the intake air flowing in the intake passage.

The converging line 16, which connects the branch lines 15L, 15R to each other, is a surge tank provided commonly for the banks 11L, 11R. However, the converging line and the surge tank may be provided separately from each other.

The present invention may be used in a V diesel engine having six or less cylinders or ten or more cylinders, other than the eight-cylinder V diesel engine 10.

The invention claimed is:

1. An air intake control device of a V diesel engine having an intake passage through which intake air is supplied to respective cylinders formed in a pair of banks of the V diesel engine, an actuator that changes the condition of the intake air flowing in the intake passage, and means for controlling operation of the actuator,
    wherein the intake passage includes a pair of connecting portions each connected to one of the banks, a converging portion that connects the connecting portions together, and a pair of branch portions branched from the converging portion and extending upstream, wherein the actuator is provided in correspondence with each of the branch portions, and wherein the control means feedback controls operation of each of the actuators in accordance with a common target control value, and
    wherein the control means feedback controls operation of the actuators in accordance with the target control value, the control means further including:
        means for determining whether there is a malfunction in the actuators; and
        means for restricting change of the condition of the intake air through a feedback control performed on one of the actuators if the determining means determines that the other one of the actuators is malfunctioning.

2. The air intake control device of the V diesel engine according to claim 1, comprising:
    a sensor that detects the condition of the intake air flowing in the intake passage, the sensor being provided in correspondence with each of the branch portions.

3. The air intake control device of the V diesel engine according to claim 2, wherein the sensor includes a pair of intake flow rate sensors each arranged in one of the branch portions,
    wherein the control means calculates the amount of the intake air flowing in the intake passage by averaging detection values provided by the intake flow rate sensors.

4. The air intake control device of the V diesel engine according to claim 1, wherein the V diesel engine further includes a pair of superchargers arranged in correspondence with the branch portions, and a pair of boost pressure changing mechanisms each changing a boost pressure of the corresponding supercharger, the boost pressure changing mechanisms serving as the actuators.

5. The air intake control device of the V diesel engine according to claim 4, wherein, if the determining means determines that one of the boost pressure changing mechanisms is malfunctioning, the restricting means minimizes a supercharging efficiency by prohibiting the feedback control on the other one of the boost pressure changing mechanisms.

6. The air intake control device of the V diesel engine according to claim 1, comprising:
    a pair of exhaust flow rate adjusting valves serving as the actuators, the exhaust flow rate adjusting valves being formed in a pair of communication lines each connecting an exhaust passage connected to the cylinders and the corresponding one of the branch portions to each other, the exhaust flow rate adjusting valves each adjusting an amount of exhaust gas recirculated to the corresponding branch portions through the associated communication passage,
    wherein, if the determining means determines that one of the exhaust flow rate adjusting valves is malfunctioning, the restricting means fully closes the other one of the exhaust flow rate adjusting valves by prohibiting the feedback control on the exhaust flow rate adjusting valve.

7. The air intake control device of the V diesel engine according to claim 1, comprising:

a pair of air intake throttle valves serving as the actuators, the air intake throttle valves being formed in the corresponding branch portions, the air intake throttle valves each adjusting the amount of the intake air passing through the corresponding branch portion, and wherein, if the determining means determines that one of the air intake throttle valves is malfunctioning, the control means fully opens the other one of the air intake throttle valves by prohibiting the feedback control on the air intake throttle valve.

8. The air intake control device of the V diesel engine according to claim 1, wherein the converging portion is formed by a surge tank provided commonly for the banks.

9. An air intake control device of a V diesel engine having an intake passage through which intake air is supplied to respective cylinders formed in a pair of banks of the V diesel engine, an actuator that changes the condition of the intake air flowing in the intake passage, and means for controlling operation of the actuator, wherein the intake passage includes a pair of connecting portions each connected to one of the banks, a converging portion that connects the connecting portions together, and a pair of branch portions branched from the converging portion and extending upstream, wherein the actuator is provided in correspondence with each of the branch portions, and wherein the control means feedback controls operation of each of the actuators in accordance with a common target control value, the air intake control device further comprising a sensor that detects the condition of the intake air flowing in the intake passage, the sensor being provided in correspondence with each of the branch portions, wherein the sensor includes a pair of intake flow rate sensors each arranged in one of the branch portions, wherein the control means calculates the amount of the intake air flowing in the intake passage by averaging detection values provided by the intake flow rate sensors, and wherein the control means performs a smoothing procedure on the detection values of the intake flow rate sensors prior to the averaging procedure.

\* \* \* \* \*